(12) United States Patent
Rovito

(10) Patent No.: US 12,330,448 B2
(45) Date of Patent: Jun. 17, 2025

(54) UNIVERSAL ROTATING HUB

(71) Applicant: GUNIWHEEL, LLC, Alpharetta, GA (US)

(72) Inventor: Sergio Rovito, Alpharetta, GA (US)

(73) Assignee: Zip's Truck Equipment, INC, New Hampton, IA (US)

( * ) Notice: Subject to any disclaimer, the term of this patent is extended or adjusted under 35 U.S.C. 154(b) by 524 days.

(21) Appl. No.: 17/690,135

(22) Filed: Mar. 9, 2022

(65) Prior Publication Data

US 2023/0286316 A1   Sep. 14, 2023

(51) Int. Cl.
*B60B 11/02* (2006.01)
*B60B 3/00* (2006.01)
*B60B 11/10* (2006.01)

(52) U.S. Cl.
CPC .............. *B60B 11/02* (2013.01); *B60B 11/10* (2013.01); *B60B 3/008* (2013.01); *B60B 2900/731* (2013.01)

(58) Field of Classification Search
CPC ......... B60B 11/02; B60B 11/10; B60B 15/26; B60B 15/263
USPC .............................. 301/35.629, 35.631, 36.1
See application file for complete search history.

(56) References Cited

U.S. PATENT DOCUMENTS

| | | | | |
|---|---|---|---|---|
| 4,333,688 A | * | 6/1982 | Lemmon | B60B 11/02 301/38.1 |
| 9,616,706 B2 | * | 4/2017 | Benoit, Jr. | B60B 11/02 |
| 9,969,211 B2 | * | 5/2018 | Niemczyk | B60B 11/02 |

* cited by examiner

*Primary Examiner* — Jason R Bellinger
(74) *Attorney, Agent, or Firm* — Thomas Horstemeyer, LLP

(57) ABSTRACT

Disclosed herein is a universal rotating hub that can facilitate movement of an automobile or other vehicle that has been rendered immobile by a condition that prevents rotation of one or more of the vehicle's wheels. The universal rotating hub can comprise a wheel flange comprising an axle bore adapted to receive an axle and a plurality of apertures adapted to receive a plurality of different lug bolt patterns of a plurality of respective wheel hubs. The universal rotating hub can further comprise a rotating flange adapted to be coupled to a wheel. The rotating flange can comprise a plurality of lug holes adapted to receive a plurality of lug bolts of the wheel. The universal rotating hub can further comprise a bearing coupled at a first end to the wheel flange and at a second end to the rotating flange. The bearing can be adapted to enable a rotation of the rotating flange.

20 Claims, 5 Drawing Sheets

UNIVERSAL ROTATING HUB

BACKGROUND

When an automobile has become inoperable or otherwise unable to move, that automobile may need to be moved to another location, such as a repair shop, so that the automobile may be repaired. Moving an inoperable automobile may entail moving the automobile onto a tow truck. And once the automobile has been transported to a repair shop, the automobile may need to be moved around the repair shop. Moving the automobile in these circumstances may be feasible if the automobile's wheels are able to rotate, allowing the automobile to be rolled onto a tow truck or around a repair shop. If, however, if the automobile has been rendered immobile because one or more of the automobile's wheels are unable to rotate—if, for example, the automobile's breaks are locked up, the axle is damaged, or the automobile is stuck in gear—it may be difficult to move that automobile may.

BRIEF DESCRIPTION OF THE DRAWINGS

For a more complete understanding of the embodiments and the advantages thereof, reference is now made to the following description, in conjunction with the accompanying figures briefly described as follows.

Figure 1A:
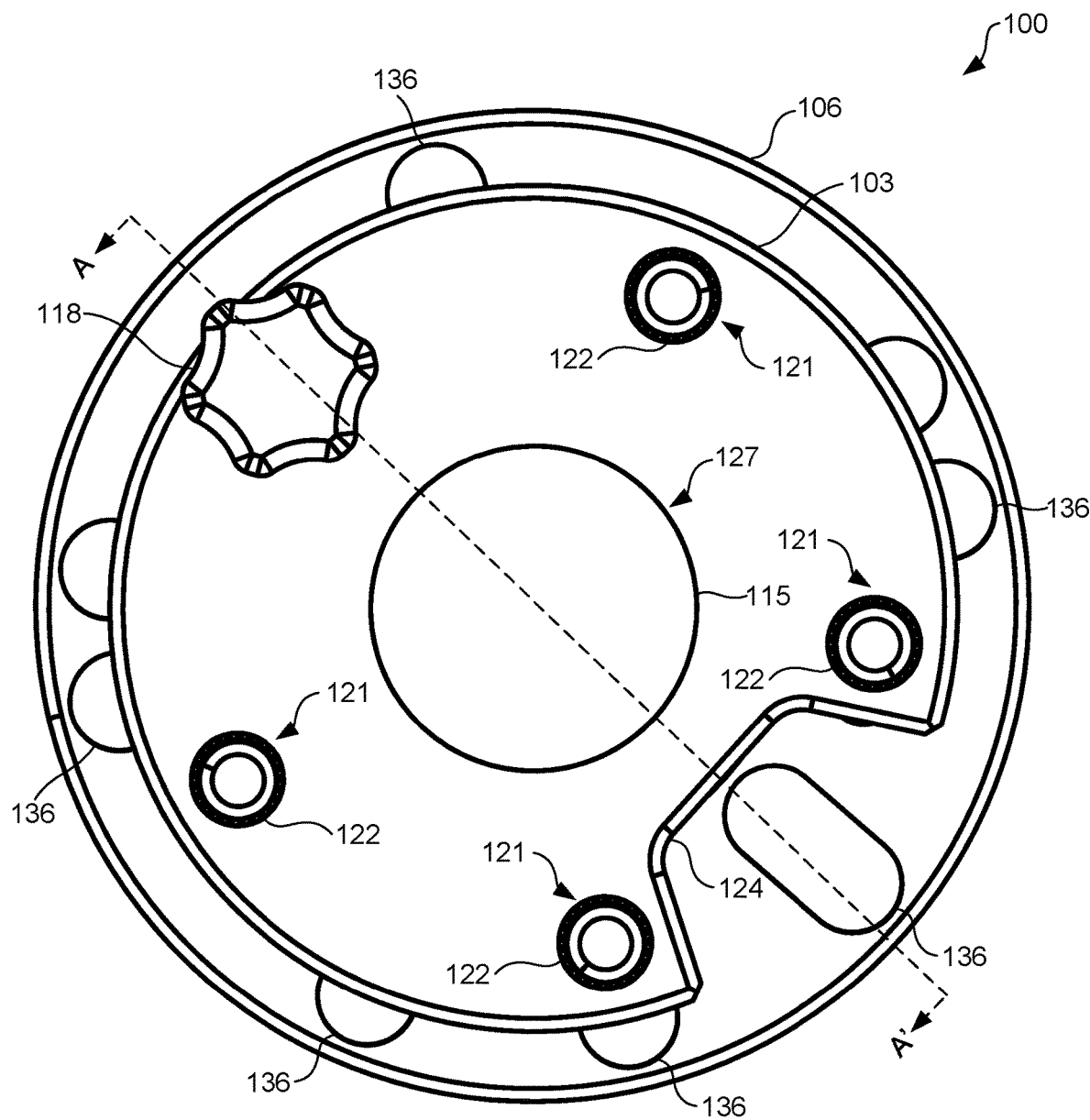
FIGS. 1A-1C show examples of multiple views of a universal rotating hub, according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

The present disclosure relates to a universal rotating vehicle hub. The universal rotating hub can facilitate movement of an automobile (or other vehicle) that has been rendered immobile by a condition that prevents rotation of one or more the automobile's wheels. The universal rotating hub can be mounted to a wheel hub of the immobile automobile. The universal rotating hub can have a universal aperture pattern that is adapted to receive different configurations of bolt patterns disposed on the wheel hubs of various axle assemblies. This can enable the universal rotating hub to be used with a variety of wheel hub configurations and lug bolt patterns. A wheel—such as, for example the automobile's own wheel or to a temporary wheel—can also be coupled to the universal rotating hub. When the universal rotating hub is simultaneously mounted to the automobile's wheel hub and coupled to a wheel, the universal rotating hub then allows the wheel to be rotated relative to the wheel hub of the automobile to facilitate rolling movement of the automobile. The universal rotating hub can therefore enable an immobile automobile to be loaded onto a tow truck and moved to and around a repair shop. Two or more universal rotating hubs can be used on vehicles that have multiple immobile wheel hubs.

Figure 1B:
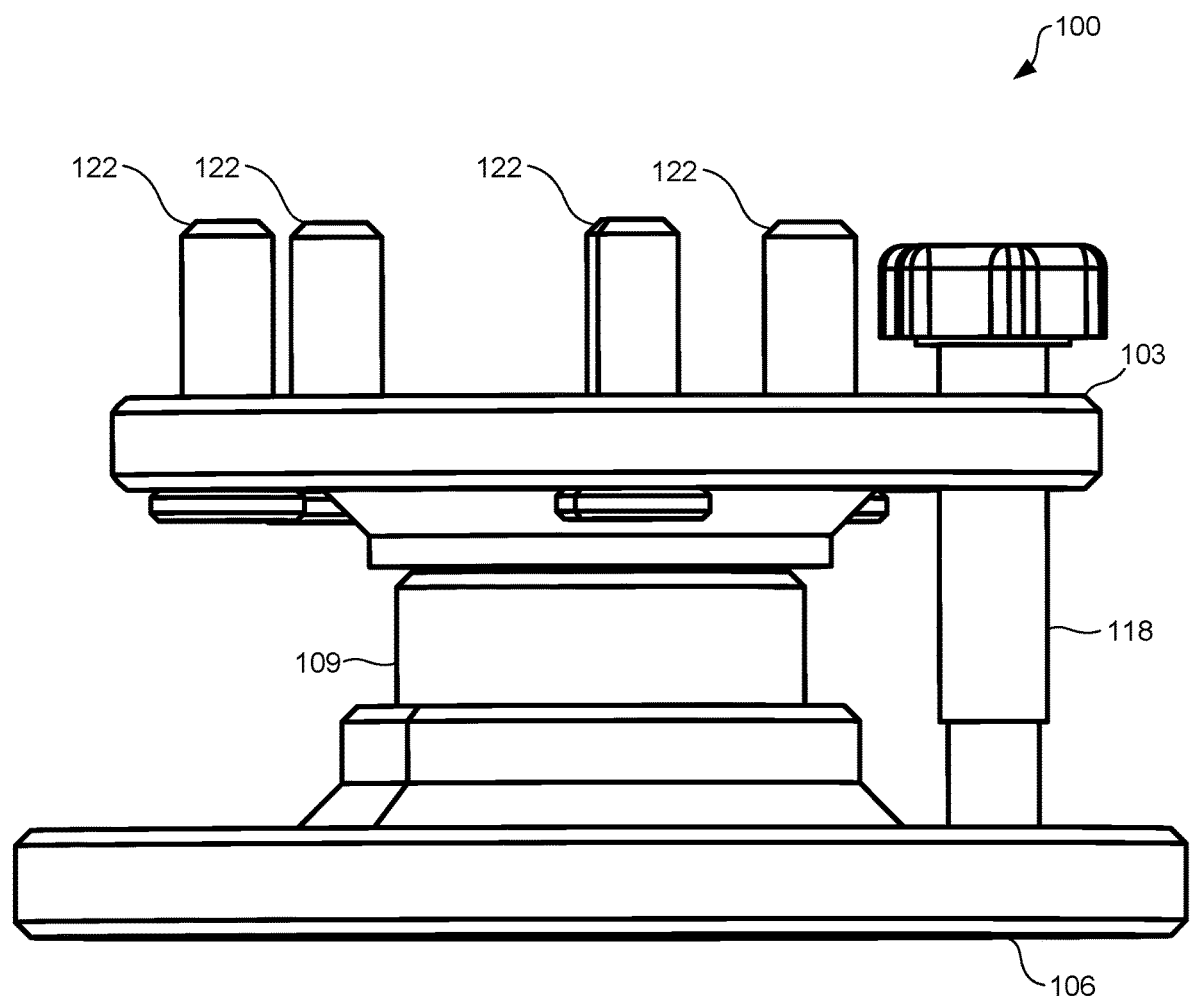
Figure 1C:
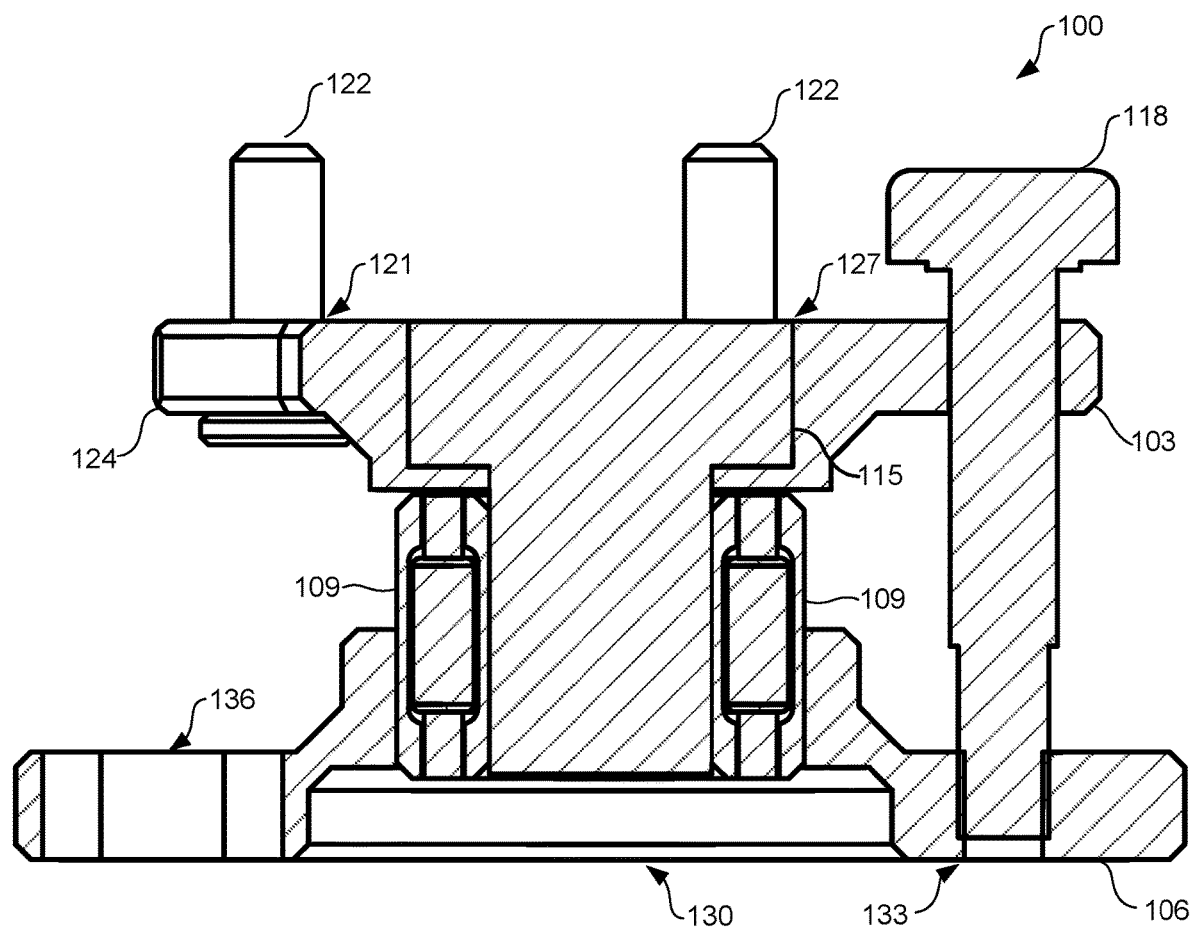

FIGS. 1A-1C show examples of a universal rotating hub 100. FIG. 1A shows an example of a front plan view of the universal rotating hub 100. FIG. 1B shows an example of an elevation view of the universal rotating hub 100. FIG. 1C shows an example of a cross-sectional view of the universal rotating hub taken along a line A-A' shown in FIG. 1A.

The universal rotating hub 100 can include a rotating flange 103 and a wheel flange 106. The rotating flange 103 and the wheel flange 106 can each be coupled to a bearing 109 via a central pin 115. In some examples, the universal rotating hub 100 can further include a locking pin 118.

As described below, the rotating flange 103 can mate with a wheel to secure the wheel to the universal rotating hub 100. The rotating flange 103 can rotate relative to the wheel flange 106 by means of the bearing 109. Rotation of the rotating flange 103 can enable a wheel secured to the rotating flange 103 to likewise rotate. Thus, when a wheel is secured to the rotating flange 103, the rotating flange 103 can rotate to facilitate rolling movement of a vehicle to which the universal rotating hub 100 is mounted, even if the vehicle is otherwise unable to move.

The rotating flange 103 can include lug holes 121 through which studs 122 or lug bolts can be inserted to allow a wheel to be mounted to the rotating flange 103. The rotating flange 103 can include a cut-out section 124 that can provide access to the lug holes 121 of the rotating flange 103 so that lug nuts may be secured to the studs 122 inserted through the lug holes 121. Rotation of the rotating flange 103 can provide access to each of the lug holes 121 in turn.

The rotating flange 103 can further include a pin bore 127 adapted to receive the central pin 115. The central pin 115 can be inserted through the pin bore 127 an into an opening in a central portion of the bearing 109 to couple the rotating flange 103 to the bearing 109. An upper opening of the pin bore 127 (which can be an opening furthest from the bearing 109) can have a width sufficient to receive a head of the central pin 115, while a lower opening of the pin bore 127 (which can be an opening furthest from the bearing 109) can have a narrower width sufficient to receive a shaft of the pin bore 127 while seating the head of the central pin 115 within the pin bore 127. The central pin 115 can be secured to the rotating flange 103 by way of welding or any other suitable fasteners or means.

The wheel flange 106 can enable the universal rotating hub 100 to be mounted to a vehicle. In particular, the wheel flange 106 can be mated to a wheel hub of a vehicle. The wheel flange 106 can have an axle bore 130 adapted to receive an axle (not shown) of a vehicle, an automobile, a recreational vehicle (RV), a tractor, a trailer, or other wheeled apparatus. When inserted through the rotating flange 103 and the bearing 109, the central pin 115 can be inserted into the axle bore 130 to couple the wheel flange 106 to the bearing 109. A lower opening of the axle bore 130 (which can be an opening furthest from the bearing 109) can have a width sufficient to receive an axle, while an upper opening of the axle bore 130 (which can be an opening closest to the bearing 109) can have a width sufficient to receive the central pin 115. The central pin 115 can be secured to the wheel flange 106 by way of welding or any other suitable fasteners or means. The wheel flange 106 can further include a plurality of locking holes 133 adapted to receive a distal end of the locking pin 118.

The wheel flange 106 can have a preselected pattern of apertures 136 adapted to receive a plurality of different bolt patterns of a plurality of respective wheel hubs coupled to the ends of axles. The pattern of apertures 136 can comprise any number of apertures having various shapes, sizes, and arrangements that allow the wheel flange 106 mate with wheel hubs having various lug bolt patterns. In the examples of FIGS. 1A-C, the pattern of apertures 136 can include eight apertures. It should be appreciated, however, that the pattern of apertures 136 shown in FIGS. 1A-C is merely an example. Other patterns of apertures 136 can be used to allow the wheel flange 106 to mate with wheel hubs having a variety of other lug bolt patterns. Indeed, the inventive principles and concepts therein are not limited with respect to the number of lug bolts that can be accommodated or with respect to the number of lug bolt patterns that can be accommodated.

The bearing 109 can enable rotation of the rotating flange 103. The bearing 109 can be any type of bearing or other device that can permit axial rotation of the rotating flange 103 relative to the wheel flange 106. The bearing 109 can support axial and radial loads. The bearing 109 can be coupled at a first end the wheel flange 106 and at a second end to the rotating flange 103. The bearing 109 can include an outer ring and an inner ring that together enclose one or more rolling elements. Relative motion of the outer ring and the inner ring can cause the one or more rolling elements to roll and therefore facilitate rotation. An opening in a central portion of the bearing 109 formed by the inner ring can be adapted to receive the shaft of the central pin 115 to couple the bearing 109 to the rotating flange 103 at a first end of the bearing 109 and to the wheel flange 106 at a second end of the bearing 109.

In some examples, the universal rotating hub 100 can include a locking pin 118. The locking pin 118 can prevent rotation of the rotating flange 103 and therefore lock the universal rotating hub 100, thereby preventing the universal rotating hub 100 from facilitating rolling movement of a vehicle to which the universal rotating hub 100 is mounted. The locking pin 118 can be inserted through a lug hole 121 of the rotating flange 103. A distal end of the locking pin 118 can be extended and retracted by rotating a knob at a proximal end of the locking pin 118. When extended, the distal end of the locking pin 118 can be inserted into a locking hole 133 of the wheel flange 106 that is aligned with the locking pin 118. Insertion of the locking pin 118 through both a lug hole 121 of the rotating flange 103 and a locking hole 133 of the wheel flange 106 can prevent rotation of the wheel flange 106 and thereby lock the universal rotating hub 100. Likewise, a subsequent retraction of the distal end of the locking pin 118 can remove the locking pin 118 from the opening in the wheel flange 106 and thereby unlock the universal rotating hub 100.

Figure 2:
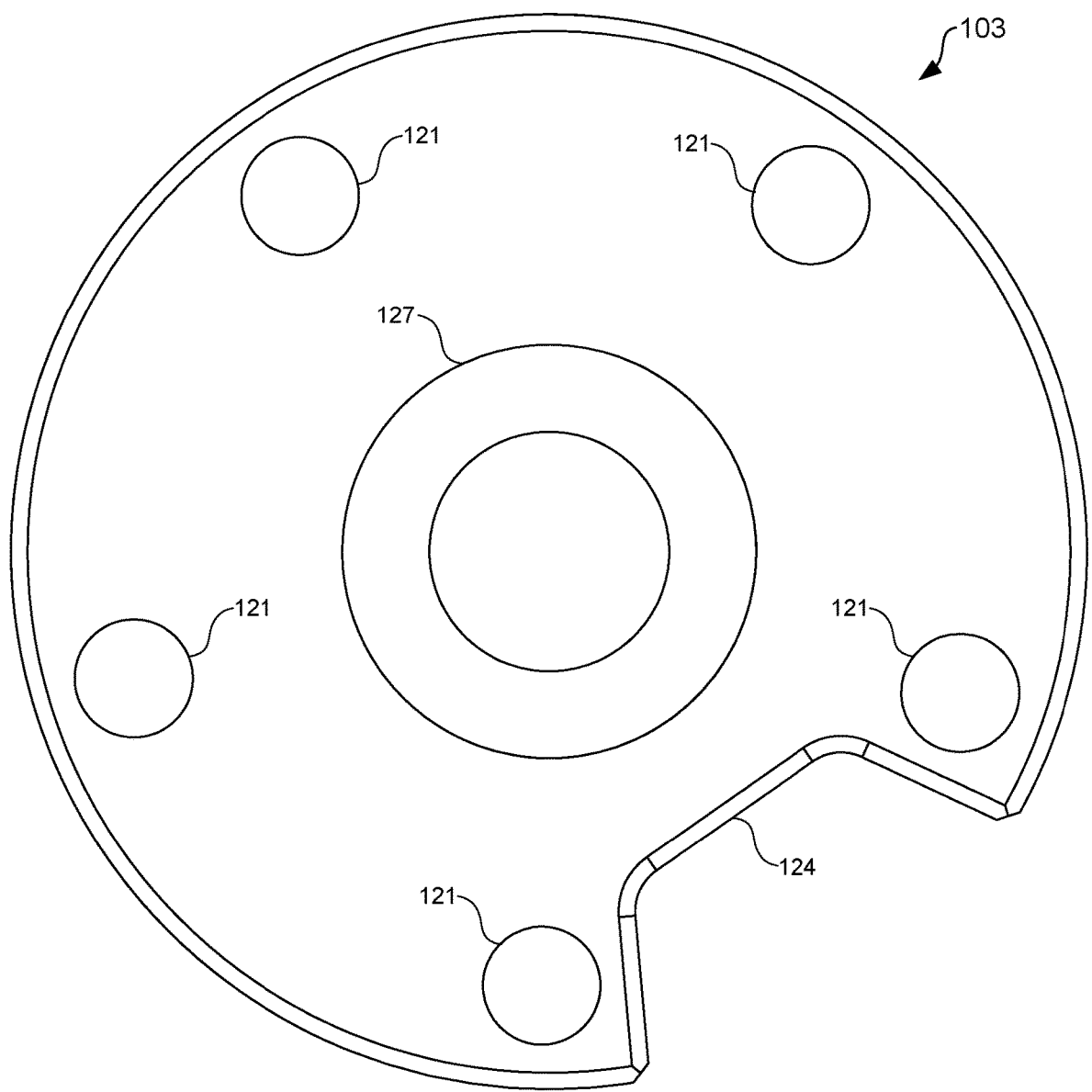
FIG. 2 shows an example of a wheel hub of the universal rotating hub of FIG. 1, according to various embodiments of the present disclosure.

FIG. 2 shows an example of the rotating flange 103 of the universal rotating hub 100. In some examples, the rotating flange 103 can have an outer diameter equal to approximately 130 mm. The upper opening of the pin bore 127 can have a diameter equal to approximately 50 mm while the lower opening of the pin bore 127 can have a diameter equal to approximately 30 mm. The lug holes 121 can each have a diameter equal to approximately 14 mm. Of course, these dimensions are dependent on the dimensions of the lug bolts or studs of the wheel with which the rotating flange 103 is intended to mate. These or similar dimensions can allow the rotating flange 103 to fit a broadest range of vehicles. While a commercial embodiment may have these dimensions, though, alternative embodiments may have varying dimensions. The rotating flange 103 and the universal rotating hub 100 are therefore not limited to having these dimensions or any particular dimensions.

Figure 3:
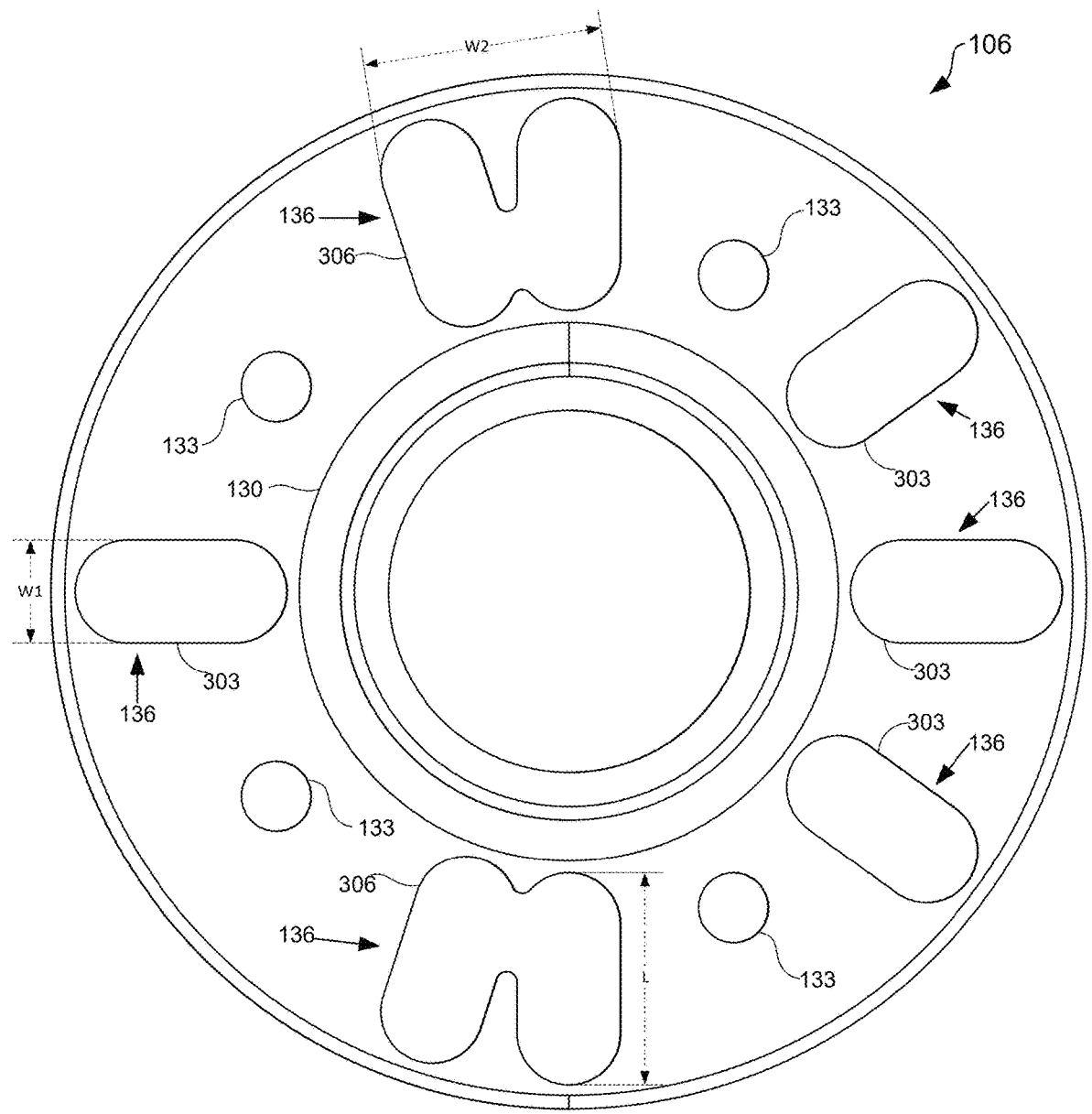
FIG. 3 shows an example of a mounting plate of the universal rotating hub of FIG. 1, according to various embodiments of present disclosure.

FIG. 3 shows an example of the wheel flange 106 of the universal rotating hub 100. In some examples, the wheel flange 106 can have an outer diameter equal to approximately 152 mm, and the lower opening of the axle bore 130 can have a diameter equal to approximately 76 mm while the upper opening of the axle bore 130 can have a diameter of approximately 53 mm. Of course, these dimensions are dependent on the dimensions of the wheel hub with which the wheel flange 106 is intended to mate. The wheel flange 106 and the universal rotating hub 100 are therefore not limited to having these dimensions or any particular dimensions.

In the example of FIG. 3, the wheel flange 106 includes a pattern of six apertures 136. The pattern of six apertures 136 is adapted to mate with wheel hubs having four- or five-lug bolt patterns. However, the wheel flange 106 can further include a pattern of eight apertures 136 adapted to mate with wheel hubs having five- or six-lug bolt patterns, a pattern of nine apertures 136 adapted to mate with wheel hubs having five- or six-lug bolt patterns, a pattern of thirteen apertures 136 adapted to mate with wheel hubs having five- or six-lug bolt patterns, a pattern of eight apertures 136 adapted to mate with wheel hubs having eight lug bolt patterns, or other patterns of apertures adapted to mate with wheel hubs having various other lug bolt patterns.

The apertures 136 of the wheel flange 106 can include a first set of apertures 303 and a second set of apertures 306. Each of the first set of apertures 303 can have a first width W1, which can be equal to, or substantially equal to, a diameter of lug bolts or studs of various wheel hubs with which the wheel flange 106 may be mated. Each of the second set of apertures 306 can have a second width W2, which can be equal to, or substantially equal to, approximately twice the first width W1 of the first set of apertures 303. For example, the first width W1 of the first set of apertures 303 can be equal to approximately 15 mm, while the second width W2 of the second set of apertures 306 can be equal to approximately 30 mm. The first set of apertures 303 and the second set of apertures 306 can have a length L. The length L of the first set of apertures 303 and the second set of apertures 306 can be equal to approximately 32 mm, for example. The first set of apertures 303 and the second set of apertures 306 are not, however, limited to having these dimensions or any particular dimensions.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that measurements, amounts, and other numerical data can be expressed herein in a range format. It is also understood that there are a number of values disclosed herein, and that each value is also herein disclosed as "approximately" that particular value in addition to the value itself. For example, if the value "10" is disclosed, then "approximately 10" is also disclosed. Similarly, when values are expressed as approximations, by use of the antecedent "approximately," it will be understood that the particular value forms a further aspect. For example, if the value "approximately 10" is disclosed, then "10" is also disclosed.

As used herein, the terms "about," "approximately," "at or about," and "substantially equal" can mean that the amount or value in question can be the exact value or a value that provides equivalent results or effects as recited in the claims or taught herein. That is, it is understood that amounts, sizes, measurements, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In general, an amount, size, measurement, parameter or other quantity or characteristic is "about," "approximate," "at or about," or "substantially equal" whether or not expressly stated to be such. It is understood that where "about," "approximately," "at or about," or "substantially equal" is used before a quantitative value, the parameter also includes the specific quantitative value itself, unless specifically stated otherwise.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

Therefore, at least the following is claimed:

1. A universal rotating hub comprising:
   a wheel flange comprising an axle bore adapted to receive an axle and a plurality of apertures adapted to receive a plurality of different lug bolt patterns of a plurality of respective wheel hubs;
   a rotating flange adapted to be coupled to a wheel, the rotating flange comprising a plurality of lug holes adapted to receive a plurality of lug bolts of the wheel; and
   a bearing coupled at a first end to the wheel flange and at a second end to the rotating flange, the bearing adapted to enable a rotation of the rotating flange.

2. The universal rotating hub of claim 1, further comprising a locking pin adapted to prevent the rotation of the rotating flange.

3. The universal rotating hub of claim 1, further comprising a central pin adapted to couple the bearing to the wheel flange and the rotating flange.

4. The universal rotating hub of claim 1, wherein the rotating flange has an outer diameter equal to approximately 130 mm.

5. The universal rotating hub of claim 1, wherein:
   the wheel flange has an outer diameter equal to approximately 152 mm;
   an upper opening of the axle bore has a diameter equal to approximately 53 mm; and
   a lower opening of the axle bore has a diameter equal to approximately 76 mm.

6. The universal rotating hub of claim 1, wherein the plurality of apertures comprises:
   a first set of apertures having a first width; and
   a second set of apertures having a second width that is greater than the first width.

7. The universal rotating hub of claim 1, wherein the rotating flange comprises a cut-out section adapted to provide access to the plurality of apertures of the wheel flange.

8. An apparatus comprising:
   a wheel flange adapted to be coupled to a wheel hub of a respective vehicle;
   a rotating flange adapted to be coupled to a temporary wheel;
   a bearing adapted to enable a rotation of the rotating flange relative to the wheel flange; and
   a central pin adapted to couple the wheel flange and the rotating flange to the bearing.

9. The apparatus of claim 8, wherein the wheel flange comprises a plurality of apertures adapted to receive a plurality of different lug bolt patterns of a plurality of respective wheel hubs, the wheel hub of the respective vehicle comprising one of the plurality of different lug bolt patterns.

10. The apparatus of claim 9, wherein the plurality of apertures comprises:
   a first set of apertures having a first width; and
   a second set of apertures having a second width that is greater than the first width.

11. The apparatus of claim 9, wherein the rotating flange comprises a cut-out section adapted to provide access to the plurality of apertures of the wheel flange.

12. The apparatus of claim 8, wherein the rotating flange comprises a plurality of lug holes adapted to receive a plurality of lug bolts of the temporary wheel.

13. The apparatus of claim 8, wherein the rotating flange has an outer diameter equal to approximately 130 mm.

14. The apparatus of claim 8, wherein the wheel flange has an outer diameter equal to approximately 152 mm.

15. The apparatus of claim 8, wherein the wheel flange comprises an axle bore adapted to receive an axle of the wheel hub of the respective vehicle.

16. The apparatus of claim 15, wherein:
   an upper opening of the axle bore has a diameter equal to approximately 53 mm; and
   a lower opening of the axle bore has a diameter equal to approximately 76 mm.

17. The apparatus of claim 8, wherein the rotating flange further comprises a pin bore adapted to receive the central pin.

18. The apparatus of claim 17, wherein:
   an upper opening of the pin bore has a diameter equal to approximately 50 mm; and
   a lower opening of the pin bore has a diameter equal to approximately 30 mm.

19. The apparatus of claim 8, wherein the bearing is coupled at a first end to the wheel flange with a shaft of the central pin and coupled at a second end to the rotating flange with a head of the central pin.

20. The apparatus of claim 8, further comprising a locking pin adapted to prevent the rotation of the rotating flange.

* * * * *